US012018890B2

(12) United States Patent
Altfeld et al.

(10) Patent No.: US 12,018,890 B2
(45) Date of Patent: Jun. 25, 2024

(54) KILN COMPRISING A PROTECTIVE SEGMENT AT THE KILN OUTLET

(71) Applicants: thyssenkrupp Industrial Solutions AG, Essen (DE); thyssenkrupp AG, Essen (DE)

(72) Inventors: Jochen Altfeld, Münster (DE); Ludwig Könning, Ahlen (DE); Thomas Rüther, Drensteinfurt (DE)

(73) Assignees: thyssenkrupp Polysius GmbH, Beckum (DE); thyssenkrupp AG, Essen (DE)

( * ) Notice: Subject to any disclaimer, the term of this patent is extended or adjusted under 35 U.S.C. 154(b) by 477 days.

(21) Appl. No.: 17/295,684

(22) PCT Filed: Nov. 25, 2019

(86) PCT No.: PCT/EP2019/082348

§ 371 (c)(1),
(2) Date: May 20, 2021

(87) PCT Pub. No.: WO2020/109199

PCT Pub. Date: Jun. 4, 2020

(65) Prior Publication Data

US 2022/0018599 A1 Jan. 20, 2022

(30) Foreign Application Priority Data

Nov. 30, 2018 (DE) ..................... 10 2018 220 727.5

(51) Int. Cl.
*F27B 7/33* (2006.01)
*F27B 7/22* (2006.01)
*F27D 9/00* (2006.01)

(52) U.S. Cl.
CPC ................ *F27B 7/224* (2013.01); *F27D 9/00* (2013.01); *F27D 2009/0008* (2013.01)

(58) Field of Classification Search
CPC .. F27B 7/33; F27B 7/224; F27B 7/386; F27D 9/00
See application file for complete search history.

(56) References Cited

U.S. PATENT DOCUMENTS 3,682,453 A * 8/1972 Powell .................... F27B 7/224 432/116
4,212,632 A * 7/1980 Conrad .................. F27B 7/224 432/115

(Continued)

FOREIGN PATENT DOCUMENTS

CN 101 984 318 A 3/2011
CN 105674730 B * 12/2017

(Continued)

OTHER PUBLICATIONS

English Translation of International Search Report issued in PCT/EP2019/082348, dated Feb. 12, 2020.

*Primary Examiner* — Gregory A Wilson
(74) *Attorney, Agent, or Firm* — thyssenkrupp North America, LLC

(57) ABSTRACT

A kiln for firing cement clinker may include a tubular rotary drum that can be rotated about its central axis. The tubular rotary drum may have a discharge end at which the cement clinker leaves the kiln. A protective segment may be attached at the discharge end and may have an outward-facing wear surface and an inward-facing cooling surface. The kiln may include a cooling device for generating a cooling air flow that flows along the inward-facing cooling surface of the protective segment. The inward-facing cooling surface can include profile bodies that are pin-shaped. The profile bodies may be uniformly spaced apart, parallel to one another, and/or present over 20% to 60% of the inward-facing cooling surface.

13 Claims, 7 Drawing Sheets

(56) References Cited

U.S. PATENT DOCUMENTS

| | | | | |
|---|---|---|---|---|
| 9,746,243 | B2 * | 8/2017 | Devroe | F27B 7/383 |
| 2003/0131973 | A1 | 7/2003 | Nair | |
| 2012/0255311 | A1 | 10/2012 | Miyake | |
| 2014/0091453 | A1 | 4/2014 | Mori et al. | |

FOREIGN PATENT DOCUMENTS

| | | | | | |
|---|---|---|---|---|---|
| DE | 2229951 | B | | 7/1973 | |
| DE | 296 18 528 | U | | 1/1997 | |
| DE | 102018220727 | A1 | * | 6/2020 | F27B 7/224 |
| EP | 1580509 | A | | 9/2005 | |
| EP | 1580509 | A1 | * | 9/2005 | F27B 7/224 |
| GB | 2315536 | A | * | 2/1998 | F27B 7/224 |
| WO | WO-2004089842 | A1 | * | 10/2004 | C04B 2/10 |
| WO | WO-2013093212 | A1 | * | 6/2013 | F27B 7/224 |

* cited by examiner

KILN COMPRISING A PROTECTIVE SEGMENT AT THE KILN OUTLET

CROSS REFERENCE TO RELATED APPLICATIONS

This application is a U.S. National Stage Entry of International Patent Application Serial Number PCT/EP2019/082348, filed Nov. 25, 2019, which claims priority to German Patent Application No. DE 10 2018 220 727.5, filed Nov. 30, 2018, the entire contents of both of which are incorporated herein by reference.

FIELD

The present disclosure generally relates to kilns for firing cement clinker.

BACKGROUND

In a kiln for firing cement clinker, such as, for example, a rotary kiln, protective segments are usually used for sealing the kiln wall and for holding the inner lining of the kiln. Such protective segments are provided at the end region of the kiln at which the fired clinker leaves the kiln. Extremely high temperatures of approximately 1200° C. to 1450° C. prevail in this region, for which reason cooling of the protective segments is necessary. However, known air cooling systems are not sufficient in the case of protective segments made, for example, of cast steel, with the result that thermally induced abrasive wear occurs already after approximately one year and leads to a high maintenance outlay and frequent downtimes of the kiln.

A protective segment for a kiln in the cement industry is known from DE 296 18 528 U1, for example.

Thus, a need exists for a protective segment that has lower thermally induced wear, which reduces downtime and maintenance outlay of kilns.

DETAILED DESCRIPTION

Figure 1:
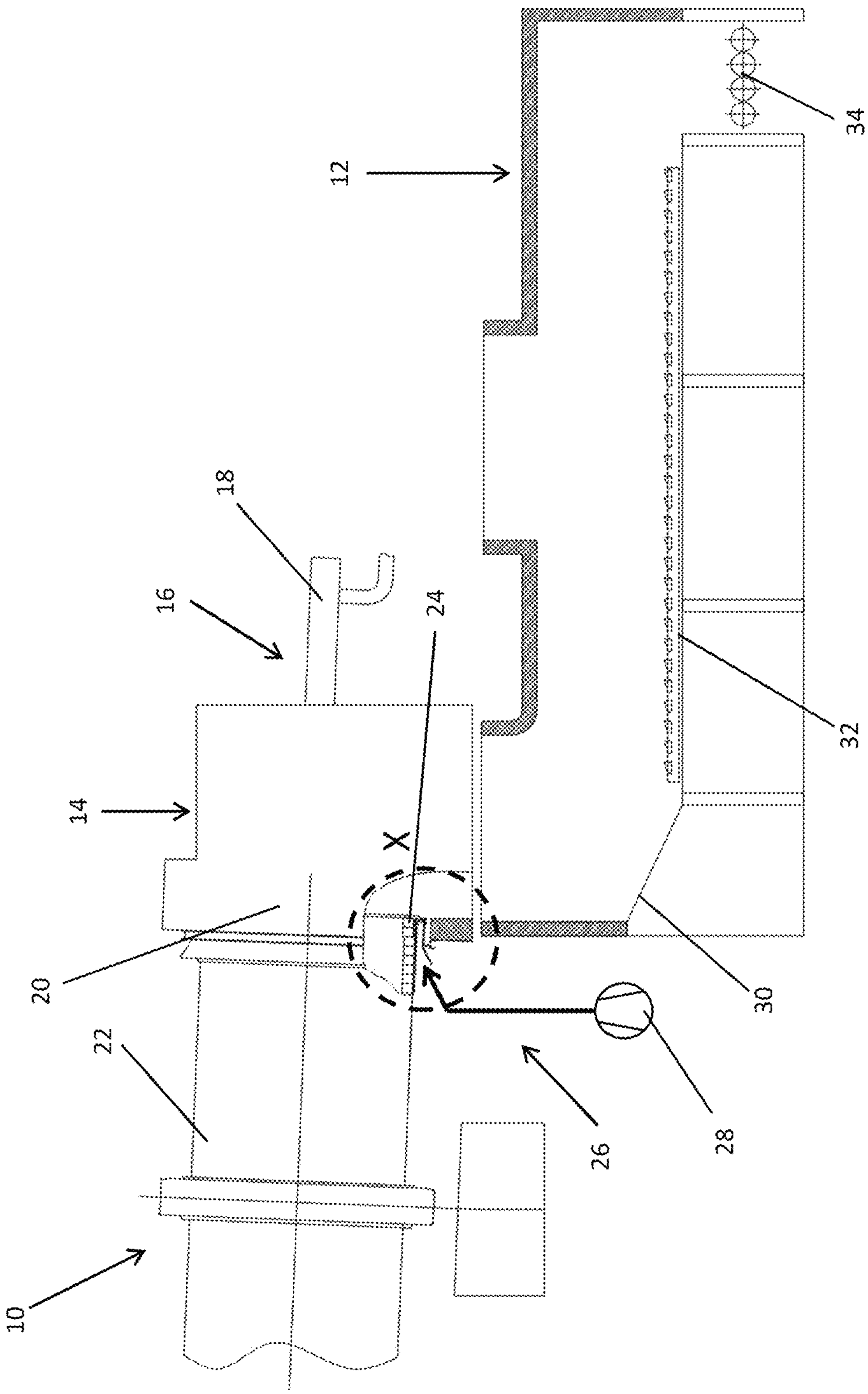
FIG. 1 is a schematic view of an example kiln of a cement production plant having a protective segment in a sectional view.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect, a kiln for firing cement clinker comprises a tubular rotary drum, which can be rotated about its central axis, wherein the rotary drum has a discharge end, at which the cement clinker leaves the kiln, a protective segment, which is attached at the discharge end and has an outward-facing wear surface and an inward-facing cooling surface, wherein the kiln has a cooling device for generating a cooling air flow, which flows along the cooling surface of the protective segment. The cooling surface has profile bodies which are of pin-shaped design, with the result that they preferably cause turbulence in the cooling air flow.

A burner for firing the clinker is preferably mounted in the kiln, which burner is mounted at least partially inside the rotary drum. The burner is preferably mounted in the vicinity of the discharge end of the rotary drum, and therefore the material to be fired is moved toward the burner within the rotary drum and slowly heated. At the discharge end of the rotary drum, the clinker therefore has a very high temperature of approximately 1200-1400° C.

The kiln preferably has a plurality of protective segments, which are arranged annularly adjacent to one another and preferably form the end face of the discharge end of the rotary drum. The cooling air flow is used to cool the protective segments. The cooling device preferably generates a cooling air flow which flows radially and/or in the circumferential direction of the rotary drum, in particular of the discharge end of the rotary drum. The cooling air flow preferably flows along the cooling surface of the protective segment, in particular parallel to the cooling surface.

The wear surface of the protective segment faces outward, in particular outward in the axial direction with respect to the rotary drum, and is preferably arranged in such a way that the clinker flows along the wear surface of the protective segment as it leaves the kiln. The cooling surface faces inward, in particular in the axial direction of the rotary drum, and does not come into direct contact with the clinker. The cooling surface preferably faces in the direction of the cooling device. The cooling device has, in particular, a cooling channel for directing the cooling air, wherein the cooling surface preferably faces in the direction of the cooling channel and, in particular, forms a wall surface of the cooling channel.

The cooling surface has pin-shaped profile bodies, which preferably extend orthogonally with respect to the cooling surface, in particular in the axial direction of the rotary drum. As an option, the pin-shaped profile bodies are connected to one another, for example via connecting webs, which are arranged between two adjacent profile bodies. As an example, about 20-60%, preferably 30-40%, in particular a maximum of 50%, of the cooling surface is occupied by profile bodies. The profile bodies preferably have a length which is greater than the thickness and width of the profile body.

Turbulence should be interpreted to mean regions of turbulent flow. In contrast to laminar flow, turbulent flow ensures better mixing of the flow. This has the effect that the cooling air flowing past the cooling surface can better absorb and carry away the heat emitted by the cooling surface. Overall, the pin-shaped profile bodies ensure more efficient cooling of the cooling surface of the protective segment.

According to a first embodiment, the profile bodies have an angular, in particular quadrangular, diamond-shaped or rectangular cross section. In the case of flows of cooling air along the cooling surface, profile elements having an angular cross section ensure deflection of the cooling air flow, with the result that turbulence is generated within the flow. According to a further embodiment, the profile bodies have a round, in particular circular, cross section.

According to a first embodiment, the cooling surface with the profile bodies has a surface at least twice as large, compared with a cooling surface without profile bodies. An enlarged surface of the cooling surface ensures improved heat transfer from the cooling surface to the cooling air.

According to a further embodiment, the profile bodies are uniformly spaced apart from one another. It is likewise conceivable for the profile bodies to have different spacings with respect to one another.

According to a further embodiment, the profile bodies are arranged parallel to one another. This enables the cooling surface to be produced easily and leads to small pressure losses in the gap region.

According to a further embodiment, the profile bodies are each spaced apart from one another, a gap thus being formed between two profile bodies. The cooling air preferably flows along the gaps formed between the profile bodies and is deflected within these gaps by the profile bodies, with the result that turbulence is generated within the cooling air flow.

According to a further embodiment, the gaps between the profile bodies form an undulating profile. The profile bodies are preferably arranged in such a way that the gaps between the profile bodies have an undulating shape. This enables reliable generation of turbulence within the cooling air flow.

According to a further embodiment, the cooling surface has a plurality of profile bodies, wherein some profile bodies have a round, in particular circular, cross section and some profile bodies have an angular, in particular quadrangular, diamond-shaped or rectangular cross section. The profile bodies having the angular cross section are preferably arranged offset with respect to the profile bodies having the round cross section.

According to a further embodiment, the profile bodies have an angular cross section, wherein an edge of each angular profile body points in the direction of flow of the cooling air flow. At the edge of the profile bodies, the cooling air flow is deflected, thus ensuring that an at least partially turbulent flow is produced.

According to a further embodiment, the cooling device has a cooling channel for directing the cooling air in the direction of the cooling surface. The cooling channel preferably extends in the circumferential direction of the rotary drum around the discharge end of the rotary drum and is arranged concentrically to the rotary drum. The preferably annular cooling channel borders on the cooling surface of the protective segment, in particular in the axial direction. The cooling device preferably has a fan which blows cooling air into the cooling channel.

According to a further embodiment, the cooling device has a guide element, which divides the cooling channel into a supply channel for supplying cool cooling air and a discharge channel for discharging heated cooling air. The guide element is preferably arranged at a distance from the cooling surface of the protective segment, with the result that cooling air flows from the supply channel along the cooling surface and subsequently into the discharge channel.

The protective segment preferably has a fastening region, which is fixedly connected, in particular screwed, to the discharge end of the kiln. The fastening region extends, for example, at an angle of approximately 30-90°, preferably 40-85°, in particular 50-80°, to the cooling surface.

Arranged inside the rotary drum there is, in particular, an inner lining which comprises a plurality of bricks, and wherein the fastening region rests against at least one brick and is fixedly connected to the latter.

FIG. 1 shows a detail of a cement production plant having a kiln 10 and a cooler 12 for cooling clinker exiting the kiln 10. The kiln 10 has an outlet region 14, at which the fired clinker leaves the kiln 10 and enters the cooler 12, e.g. the clinker falls under the effect of gravity into the cooler 12, which is arranged below the kiln 10, preferably below the outlet region 14. Of the kiln 10, FIG. 1 shows only the rear region of the kiln 10 in the direction of flow of the clinker. The kiln 10 is preferably a rotary kiln having a rotary drum 22 of tubular design, which has a slight inclination to the horizontal of, for example, 1-10°, in particular 2-5°, preferably 3°, and rotates about its central axis. The material to be fired, preferably raw meal preheated in a preheater (not shown), is moved in the direction of the outlet region 14 by the rotation of the kiln 10. Inside the kiln 10, the latter has a combustion chamber 20, in which the raw meal is fired to form clinker. Arranged in the outlet region 14 is a combustion device 16, of which only a fuel line 18 for carrying fuel, such as gas, to a burner is shown schematically in FIG. 1. The fuel line 18 is arranged at least partially outside the combustion chamber 20, wherein the burner is arranged within the combustion chamber 20, preferably at the right-hand end of the kiln 10 in FIG. 1, in the outlet region 14. The hottest region of the kiln 10 is therefore in the region in which the burner is arranged, for which reason the temperatures in the outlet region 14 are approximately 1200° C. to 1450° C. during operation of the kiln 10. The outlet region 14 comprises the discharge end 24 of the rotary drum 22, in particular the outer edge of the rotary drum 22, via which the fired clinker is conveyed and leaves the kiln 10.

The kiln furthermore has a cooling device 26 for cooling the discharge end 24 of the rotary drum 22. The cooling device 26 comprises a blower 28, preferably a fan, for generating cooling air. The cooling air is conducted through a line shown schematically in FIG. 1 to the discharge end 24 of the rotary drum 22 in order to cool the latter. A detailed illustration of the discharge end 24 of the rotary drum 22 is shown in FIG. 2.

FIG. 1 also shows a cooler 12 downstream of the kiln 10, said cooler having a preferably static grate 30, which is arranged below the discharge end 24 of the rotary kiln 22, so that the clinker falls from the discharge end 24 onto the static grate 30. The static grate 30 has an angle of approximately 5-30°, preferably 10-20°, to the horizontal, and therefore the clinker slips off the static grate 30. Adjoining the static grate 30 there is, for example, a conveying unit 32, which extends horizontally, for example. The conveying unit 32 serves to transport the clinker in the conveying direction (from left to right in FIG. 1), while cooling air flows through the clinker in a transverse flow from below the conveying unit 32 during transport. The conveying unit 32 is, for example, a moving floor conveyor with a plurality of parallel grate planks which can be moved simultaneously in the conveying direction and non-simultaneously counter to the conveying direction. The grate planks serve to receive the clinker and are traversed by cooling air from below, ensuring that the clinker lying on the grate planks is cooled and simultaneously transported in the conveying direction. The conveying unit can also be a pusher conveyor which has a stationary air admission floor, preferably a grate, and a plurality of conveying elements arranged above the air admission floor. By way of example, the conveying elements are arranged in the form of planks and parallel to one another and can be moved simultaneously in the conveying direction and non-simultaneously counter to the conveying direction. The clinker lying on the air admission floor is transported in the conveying direction and at the same time cooled by cooling air which flows through the air admission floor from below. A comminuting device 34 adjoins the conveying unit 32 of the cooler 12 in the conveying direction. The comminuting device 34 is, for example, a crusher, preferably a roll crusher, or a mill, preferably a roll mill.

During operation of the cement plant, preheated raw meal is introduced into the kiln 10 and transported therein in the direction of the discharge end 24 and the burner by the rotation of the rotary drum 22, with the result that the raw meal is preferably uniformly heated and fired to form cement clinker. The fired clinker falls via the discharge end 24 of the rotary drum 22 onto the static grate 30 of the cooler 12 arranged underneath and slides from the latter in the direction of the conveying unit 32. By means of the conveying unit 32, the clinker is transported in the conveying direction and, at the end of the conveying unit, falls from the cooler 12 into the comminuting device 34, in which the clinker is comminuted. It is likewise conceivable for a conveyor belt onto which the clinker falls to be arranged downstream of the cooler 12. The comminuting device 34 is only optional.

Figure 2:
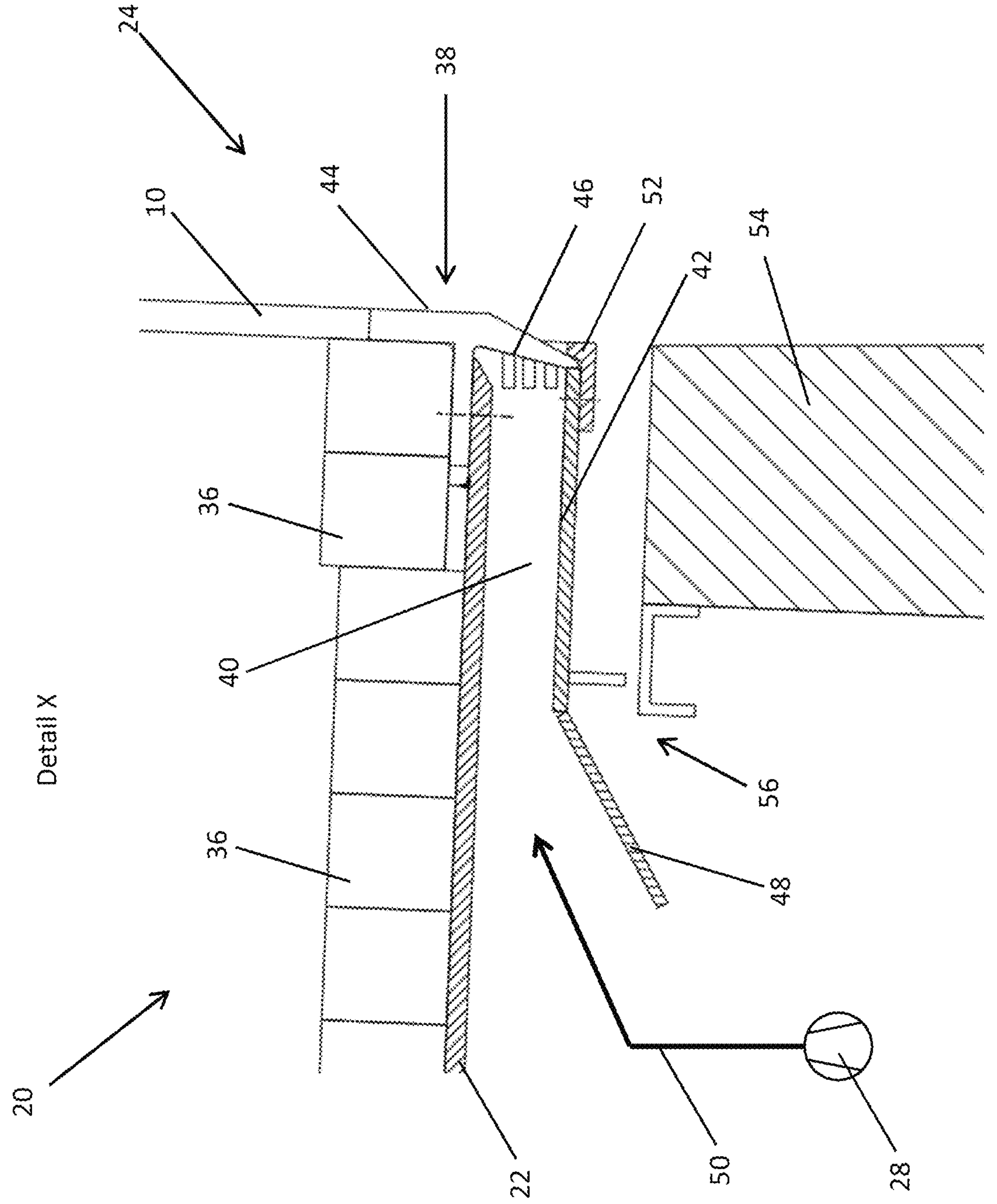
FIG. 2 is a schematic detail view of an example discharge end of a rotary drum of the kiln according to FIG. 1.

FIG. 2 shows a detailed illustration of the discharge end 24 of the rotary drum 22 of the cooler 10 according to FIG. 1, wherein identical elements are provided with the same reference signs. The rotary drum 22 has an inner lining, which preferably extends along the entire inner wall of the rotary drum 22 and comprises a brick lining with a plurality of bricks 36, which preferably consist of refractory material, such as magnesia spinel, for example. The bricks 36 are arranged adjacent to one another in such a way that they cover the entire inner wall of the rotary drum and form the bearing surface for the material to be fired. The bricks 36 preferably rest directly against the inner wall of the rotary drum 22 and are arranged adjacent to one another, for example in circumferential rows.

The discharge end 24 of the rotary drum 22 has, for example, two circumferential rows of bricks 36 which are arranged raised relative to the remaining bricks 36 of the inner lining. By way of example, a protective segment 38 is arranged between the at least one brick 36 and the rotary drum 22. The protective segment 38, in particular a plurality of protective segments, forms the discharge edge of the rotary drum 22, via which the clinker is conveyed and from which the clinker falls into the cooler 12. The kiln 10 comprises a plurality of protective segments 38, which are arranged circumferentially adjacent to one another and together form the overall discharge edge running around the circumference of the rotary drum 22. A cooling channel 40 for cooling the discharge end 24 of the rotary drum 22 is arranged around the circumference of the discharge end 24 of the rotary drum 22. The cooling channel 40 has a wall 42 which extends at a distance around the discharge end 24 of the rotary drum 22. The wall 42 extends at least partially concentrically with respect to the rotary drum 22 and has an end region 48 which extends radially outward at an angle of, for example, 20-50°, preferably 30-40°, in particular 45°, to the central axis of the rotary drum 22. The cooling channel 40 is connected to the fan 28, and therefore cooling air is conducted from the fan 28 into the cooling channel 40, for example via a line 50, preferably in the axial direction of the rotary drum 22. Each protective segment 38 has an outward-facing wear surface 44 and an inward-facing cooling surface 46. The wear surface 44 preferably faces in the direction of the burner, in particular in the direction of the outlet region 14 of the kiln 10, in which the temperatures are approximately 1200° C. to 1450° C., wherein the wear surface 44 is in direct contact with the temperatures in the outlet region 14. In particular, the clinker emerging from the rotary drum 12 flows along the wear surface 44 into the cooler 12. The wear surface 44 extends vertically, for example, in particular in the radial direction of the rotary drum 22. The protective segment preferably forms the outermost surface in the axial direction of the rotary drum 22, in particular the end face of the rotary drum 22. The cooling surface 46 faces in the direction of the cooling channel 40 and forms the end wall of the cooling channel 40, wherein the cooling air, which initially flows axially in the cooling channel 40, impinges on the cooling surface 46 of the protective segment 38 and is deflected on the latter in such a way that it flows at least partially or completely in the circumferential direction of the rotary drum 22 and preferably directly along the cooling surface 46 of the protective segment 38. In particular, the cooling air absorbs the heat of the cooling surface 46 and then flows from the cooling surface 46 out of the cooling channel 40 in the axial direction of the rotary drum 22. The protective segment 38 preferably rests with its upper end against at least one brick 36 and with its lower end against the wall 42 of the cooling channel 40, and therefore the cooling channel 40 is separated from the ambient air by the protective segment 38. The protective segment 38 is preferably fastened to the wall 42 by means of a fastening element 52. The fastening element 52 is, for example, a sleeve or a sleeve segment with a radially-inward pointing edge, wherein the fastening element 52 is screwed to the wall 42. The edge of the sleeve or sleeve segment rests against the outside of the protective segment 38 and clamps the latter between the wall 42 and the edge, thus preventing movement, in particular in the axial direction of the rotary drum 22. The protective segment 38 and the wall 42 of the cooling channel 40 are fixedly connected to the rotary drum 22, and therefore the protective segment 38 and the wall 42 of the cooling channel 40 rotate with the rotary drum 22.

The kiln 10 furthermore has, by way of example, an outer wall 54, which is preferably part of the outlet region 14 of the kiln 10 and, by way of example, extends in the vertical direction in FIG. 2. By way of example, a seal 56, preferably a simple gap seal, is provided between the outer wall 54 and the wall 42 of the cooling channel 40, said seal preventing clinker from getting out of the outlet region 14 of the kiln 10 between the stationary outer wall 54 and the rotating rotary drum 22. Other embodiments of the seal are possible. The seal has, by way of example, a first sealing segment, which is fastened to the wall 42 and rotates with the rotary drum 22, and a second sealing segment, which is fastened to the outer wall 54 and is stationary. The sealing segments are arranged relative to one another in such a way that there is a gap between them, which preferably has a size of 5-10 mm, in order to prevent sliding contact between the sealing segments and nevertheless to prevent clinker from escaping.

Figure 3:
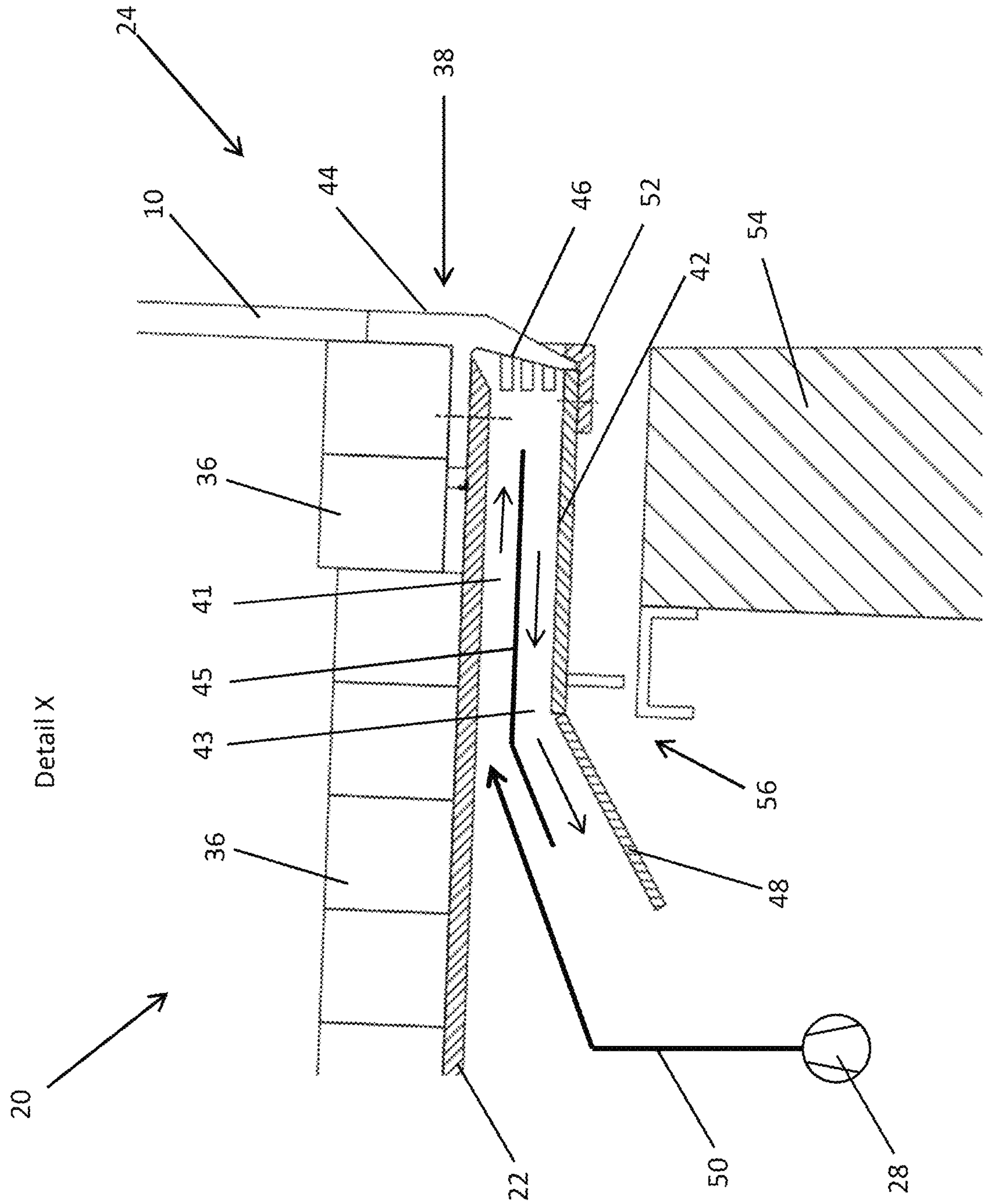
FIG. 3 is a schematic detail view of an example discharge end of a rotary drum of another example kiln.

FIG. 3 shows a detailed illustration of the discharge end 24 of the rotary drum 22 of the cooler 10 which corresponds substantially to FIG. 2 and in which identical elements are provided with the same reference signs. In contrast to FIG.

2, the cooling channel 40 of FIG. 3 has a guide element 45, which guides the cooling channel 40 into two channels, preferably a supply channel 41 and a discharge channel 43. The guide element 45 is, for example, a separating plate which is mounted centrally within the cooling channel 40 and extends in the axial direction of the rotary drum 22. The guide element 45 preferably extends over the entire width, in particular in the circumferential direction, of the cooling channel 40. A gap is formed between the guide element 45 and the cooling surface 46, through which gap the cooling air flows from the supply channel 41, along the cooling surface 46, into the discharge channel 43. In the exemplary embodiment of FIG. 3, the cooling air preferably flows in the radial direction, in particular from the inside to the outside, along the cooling surface 46. The supply channel 41 is preferably connected directly to the fan 28 via the line 50 and serves to supply cool cooling air to the cooling surface 46 of the protective segment 38. The discharge channel 43 adjoins the supply channel 41 in the direction of flow of the cooling air and serves to discharge the cooling air heated at the cooling surface 46 from the channel 40. The discharge channel 43 is preferably connected to the ambient air, thus ensuring that the heated cooling air is fed to the ambient air. The supply channel 41 and the discharge channel 43 preferably extend parallel to one another. By way of example, the supply channel 41 is arranged radially on the inside, in the direction of the rotary drum 22, relative to the discharge channel 43. The guide element 45 is preferably fastened by means of a static connection.

Figure 4:
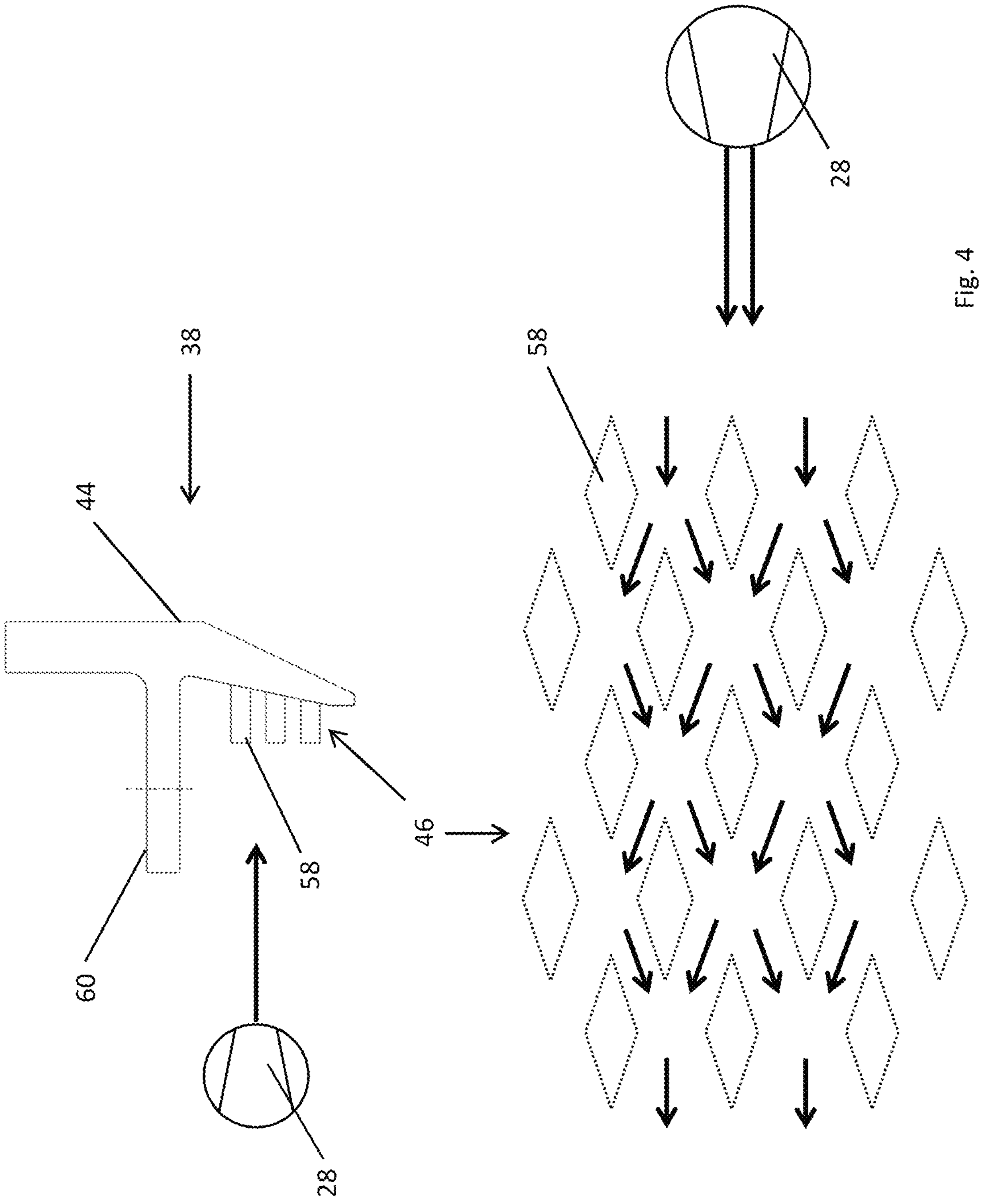
FIG. 4 is a schematic view of another example example protective segment of a kiln in a sectional view and a partial plan view.

FIG. 4 shows a protective segment 38 as described with reference to FIGS. 2 and 3. Identical elements have the same reference signs. In the exemplary embodiment of FIG. 4, the protective segment 38 has a T-profile, which comprises three legs which are of substantially plate-shaped design. A first leg is a fastening region 60 of the protective segment 38, which rests against the inner lining of the rotary drum 22, in particular against a brick 36, and is fastened thereto by means of a fastening means such as a screw. The fastening region 60 is, for example, of plate-shaped design and extends, in particular, orthogonally with respect to the wear surface 44. In the installed position, e.g. in FIGS. 2 and 3, the fastening region 60 of the protective segment 38 rests with its upper surface against the underside of the brick 36 and is screwed thereto, for example. The lower surface of the fastening region 60 rests against the inner side of the rotary drum 22 and is screwed to the latter, for example.

A second leg of the protective segment 38 extends orthogonally with respect to the fastening region 60 and rests against a brick 36 in the installed position of FIGS. 2 and 3. In FIG. 4, by way of example, a third leg of the protective segment 38 extends at an angle of approximately 45-90°, in particular 60-80°, preferably 70°, to the fastening region 60, in particular below the fastening region. It is likewise conceivable for the second and third legs to be arranged parallel to one another, preferably in each case orthogonally with respect to the fastening region 60. The wear region 44 extends over the outward-facing side of the second and third legs of the protective segment 38. The third leg has the cooling surface 46 on the inward-facing side. The cooling surface 46 has a profile which comprises a plurality of profile bodies 58, which are designed as elevations and extend in the direction of the cooling channel 40, in particular parallel to the fastening region 60 of the protective segment 38.

FIG. 4 also shows a schematic illustration of the profile of the cooling surface 46. By way of example, the profile bodies 58 are each of pin-shaped design and have a quadrangular, e.g diamond-shaped, cross section. The profile bodies 58 are arranged parallel to one another and, for example, all have the same orientation. During operation of the kiln, the cooling air flows in the circumferential direction (FIG. 2) or in the radial direction of the rotary drum (FIG. 3), preferably from the inside to the outside, along the cooling surface 46. The profile bodies 58 preferably extend orthogonally with respect to the direction of flow of the cooling air. The profile bodies 58 are arranged spaced apart from one another, with the result that a gap through which cooling air can flow is formed in each case between two adjacent profile bodies 58. By way of example, the profile bodies 58 all have the same cross section and preferably the same length. It is likewise conceivable for the size of the cross section of the profile bodies 58 to vary. The profile bodies 58 are preferably uniformly spaced apart from one another, and therefore the width of the respective gap between two profile bodies 58 is constant over the entire cooling surface. The profile bodies 58 are preferably arranged uniformly offset with respect to one another. A profile body preferably has a length of at least 30 mm. For example, the profile bodies 58 can also be connected to one another by webs, giving rise to the formation of an undulating gap.

FIG. 4 also shows the fan 28 that generates the cooling air flow. The arrows represent the direction of flow of the cooling air. In the exemplary embodiment of FIG. 3, the cooling air flows through the cooling channel 40, preferably in the axial direction of the rotary drum 22. When the cooling air impinges on the cooling surface 46, it is preferably deflected in the radial direction of the rotary drum 22, with the result that the cooling air flows radially outward along the cooling surface 46. In the exemplary embodiment of FIG. 3, the cooling air flows along the cooling surface in the circumferential direction of the rotary drum 22. The arrows represent the respective direction of flow of the cooling air. The profile bodies 58 are preferably aligned in such a way that one edge of the quadrangular cross section points in the direction of flow of the cooling air, thus ensuring that the cooling air impinges on the edge of the profile body and is deflected on the latter.

Figure 5:
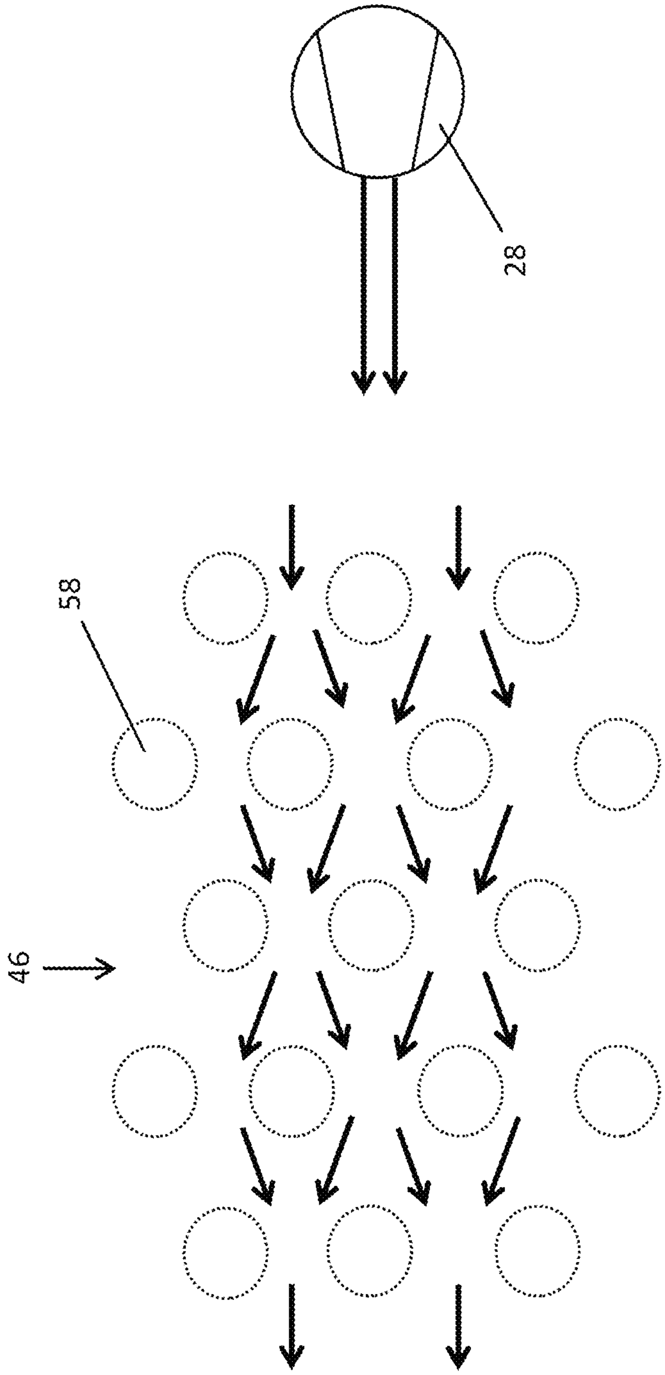
FIG. 5 is a schematic view of an example profile of a cooling surface of a protective segment in plan view.

FIG. 5 likewise shows a profile of the cooling surface 46 with a plurality of profile bodies 58, wherein the cooling surface 46 corresponds substantially to the cooling surface 46 shown in FIG. 3. Identical elements have the same reference signs. In contrast to FIG. 4, the profile bodies 58 have a round, in particular circular, cross section.

Figure 6:
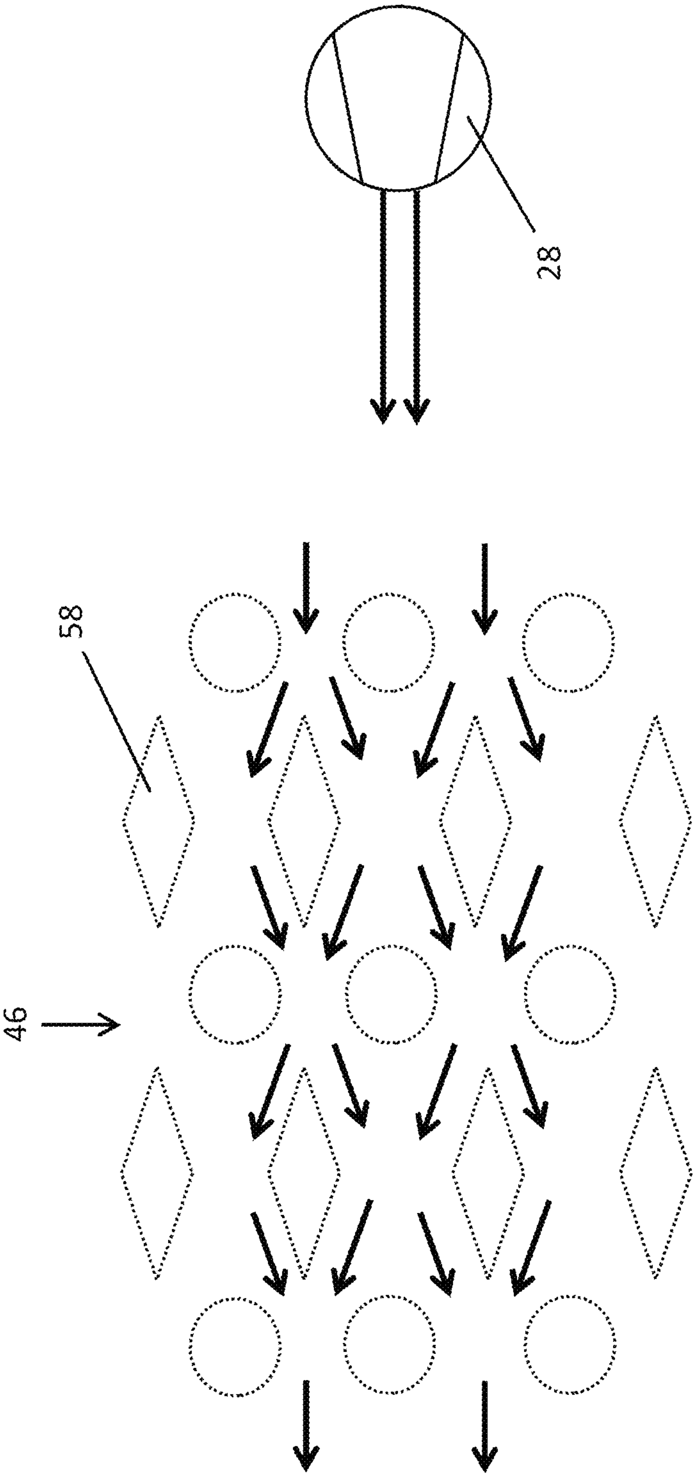
FIG. 6 is a schematic view of another example profile of a cooling surface of a protective segment in plan view.

FIG. 6 also shows a profile of the cooling surface 46 with a plurality of profile bodies 58, wherein the cooling surface 46 corresponds substantially to the cooling surface 46 shown in FIG. 4 or 5. Identical elements have the same reference signs. In contrast to FIGS. 4 and 5, FIG. 6 shows two different types of profile bodies 58. A first type of profile body 58 has a quadrangular, in particular diamond-shaped, cross section and a second type of profile body 58 has a round, in particular circular, cross section. The two types of profile bodies 58 are preferably arranged in a uniformly distributed manner over the cooling surface 46. In each case, a round profile body 58 is arranged adjacent to a quadrangular profile body.

Figure 7:
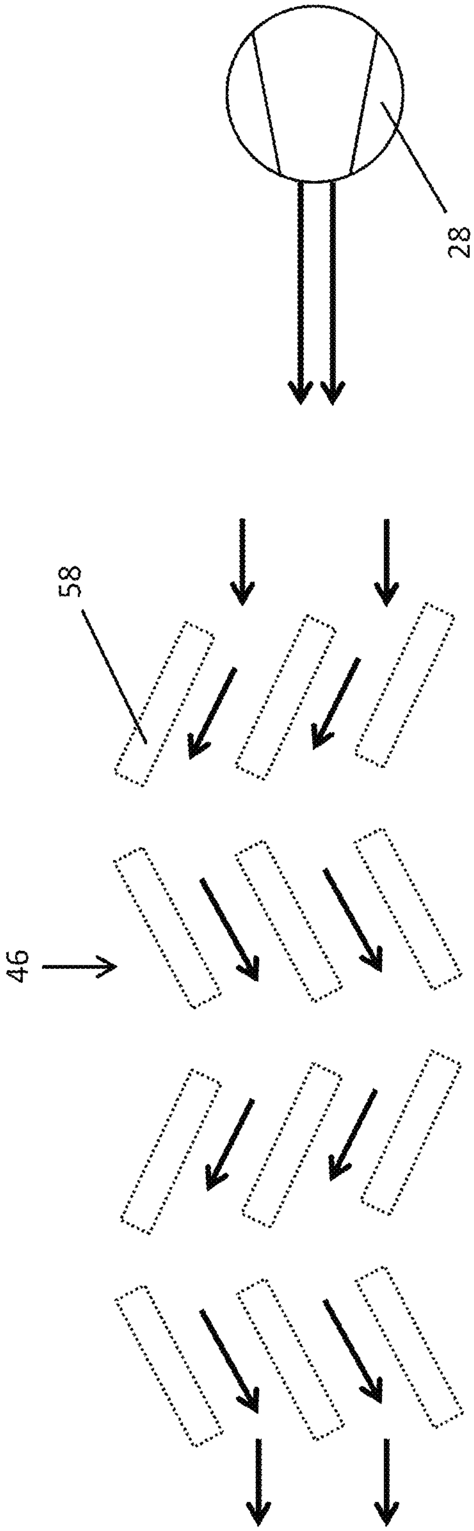
FIG. 7 is a schematic view of still another example profile of a cooling surface of a protective segment in plan view.

FIG. 7 likewise shows a profile of the cooling surface 46 with a plurality of profile bodies 58, wherein the cooling surface 46 corresponds substantially to the cooling surface 46 shown in FIG. 4, 5 or 6. Identical elements have the same reference signs. In contrast to the profiles described above, the profile bodies 58 of FIG. 7 have a rectangular cross section. All the profile bodies 58 preferably have a rectangular cross section, the profile bodies 58 being of plate-shaped design. The profile bodies 58 are arranged relative to one another in such a way that a gap is formed in each case between two adjacent profile bodies 58, the gaps forming an undulating pattern over the cooling surface 46. The profile bodies 58 are preferably arranged in an undulating manner with respect to one another. The cooling air flows in the direction of the arrow along the profile bodies 58, these being arranged in such a way that turbulence is caused in the cooling air flow.

The profile bodies 58 of the above-described profiles of FIGS. 4-7 are preferably arranged in such a way that cooling air flowing along the profile bodies 58, preferably along the cooling surface 46, is deflected in such a way that turbulence occurs in the cooling air flow. Turbulence should be interpreted to mean regions of turbulent flow. The profile bodies 58 are arranged in such a way that at least one region in which a turbulent flow is present is formed in the cooling air flow. In contrast to laminar flow, turbulent flow ensures better mixing of the cooling air flow. The spacings must be adjusted in such a way that an optimum of better mixing and low pressure loss is achieved. This leads to more effective cooling of the protective segment 38, in particular of the cooling surface 46, since the heated cooling air is rapidly and efficiently mixed with the cooler cooling air and the full volume flow is available.

LIST OF REFERENCE SIGNS

10 kiln
12 cooler
14 outlet region
16 combustion device
18 fuel line
20 combustion chamber
22 rotary drum
24 discharge end
26 cooling device
28 fan
30 static grate
32 conveying unit
34 comminuting device
36 brick
38 protective segment
40 cooling channel
41 supply channel
42 wall
43 discharge channel
44 wear surface
45 guide element
46 cooling surface
48 end region of the wall 42
50 line
52 fastening element
54 outer wall
56 seal
58 profile body

What is claimed is:

1. A kiln for firing cement clinker, the kiln comprising:
a tubular rotary drum that is rotatable about a central axis, wherein the tubular rotary drum includes a discharge end at which the cement clinker leaves the kiln;
a protective segment that is attached at the discharge end and includes an outward-facing wear surface and an inward-facing cooling surface, wherein the inward-facing cooling surface includes profile bodies that are pin-shaped, and wherein the profile bodies are spaced apart such that a gap is formed between each two adjoining profile bodies; and
a cooling device for generating a cooling air flow that flows along the inward-facing cooling surface of the protective segment.

2. The kiln of claim 1 wherein the profile bodies have a cross section that is angular, diamond-shaped, or rectangular.

3. The kiln of claim 1 wherein the profile bodies have a cross section that is diamond-shaped or rectangular.

4. The kiln of claim 1 wherein the profile bodies have a cross section that is round.

5. The kiln of claim 1 wherein the profile bodies are uniformly spaced apart.

6. The kiln of claim 1 wherein the profile bodies are parallel to one another.

7. The kiln of claim 1 wherein the profile bodies occupy 20% to 60% of the inward-facing cooling surface.

8. The kiln of claim 1 wherein a portion of the inward-facing cooling surface that includes the profile bodies is at least twice as large as a portion of an inward-facing cooling surface that does not include the profile bodies.

9. The kiln of claim 1 wherein the gaps form an undulating profile.

10. The kiln of claim 1 wherein some of the profile bodies have a first cross section that is round and some of the profile bodies have a second cross section that is angular, diamond shaped, or rectangular.

11. The kiln of claim 1 wherein the cooling device includes a cooling channel for directing the cooling air flow in a direction of the inward-facing cooling surface.

12. The kiln of claim 11 wherein the cooling device includes a guide element that divides the cooling channel into a supply channel for supplying the cooling air flow and a discharge channel for discharging heated cooling air.

13. The kiln of claim 1 wherein the profile bodies have an angular cross section, wherein an edge of each profile body points in a direction of the cooling air flow.

* * * * *